United States Patent [19]

Brown et al.

[11] E Re. 30,427

[45] Reissued Nov. 4, 1980

[54] MAXIMUM LIQUID LEVEL CONTROL VALVE

[75] Inventors: Harley D. Brown, P.O. Box 844, Bedford, Ind. 47421; Harley Brown, Bedford, Ind.

[73] Assignee: Harley D. Brown, Bedford, Ind.

[21] Appl. No.: 42,365

[22] Filed: May 25, 1979

Related U.S. Patent Documents

Reissue of:

[64] Patent No.: 4,142,552
Issued: Mar. 6, 1979
Appl. No.: 778,371
Filed: Mar. 17, 1977

[51] Int. Cl.[2] ..... F16K 33/18; F16K 33/00

[52] U.S. Cl. ..... 137/446; 141/198

[58] Field of Search ..... 137/441, 442, 443, 444, 137/446, 448; 141/198; 251/318, 319, 321, 322, 323, 337

[56] References Cited

U.S. PATENT DOCUMENTS

| | | | |
|---|---|---|---|
| 348,364 | 8/1886 | Weeden | 137/446 |
| 767,848 | 8/1904 | Stillman | 137/443 |
| 993,587 | 5/1911 | Dodd | 137/448 |
| 1,389,907 | 9/1921 | Sherwood | 137/444 |
| 2,023,284 | 12/1935 | Osborn | 137/443 |
| 2,504,638 | 4/1950 | Browning | 137/446 |
| 2,756,769 | 7/1956 | Martin et al. | 137/446 |
| 2,881,790 | 4/1959 | McCarty | 137/444 |
| 3,338,262 | 8/1967 | Chopelin | 137/442 |
| 3,756,269 | 9/1973 | Brown | 137/448 |

*Primary Examiner*—Martin P. Schwadron
*Assistant Examiner*—G. L. Walton
*Attorney, Agent, or Firm*—Woodard, Weikart, Emhardt & Naughton

[57] ABSTRACT

A maximum liquid level control valve for limiting the flow of liquid petroleum gas into a tank having a valve body, a float pivotally attached to the valve body, a closure flap, a spring acting between the valve body and the closure flap, and a cam device movable by the float. The control valve which is mounted to a flange welded to the side wall of the tank has a valve seat and a passage for liquid to flow through the valve body into the tank. The closure flap is movable toward the valve seat to a closed position and away from the valve seat to an open position. The closure flap is movable to the closed position under incoming liquid pressure. When the liquid level in the tank is below the maximum liquid level, the cam device acts on a stem which is attached to the closure flap. With the cam acting on the stem, the closure flap cannot be moved to the closed position in response to incoming liquid pressure. When the maximum liquid level is reached, the cam device rotates unblocking the stem, the spring constant of the spring is overcome by incoming liquid pressure, and the closure flap is moved to the closed position. When the tank is filled, the source of liquid petroleum gas is shut off and any pressure trapped within the control valve and working against the closure flap is released through a bleeder hole. Then the spring returns the closure flap from the closed position to the open position.

11 Claims, 3 Drawing Figures

MAXIMUM LIQUID LEVEL CONTROL VALVE

Matter enclosed in heavy brackets [ ] appears in the original patent but forms no part of this reissue specification; matter printed in italics indicates the additions made by reissue.

BACKGROUND OF THE INVENTION

1. Field of the Invention:

This invention relates in general to valves for controlling the liquid level within a tank.

2. Description of the Prior Art:

Upon storing liquid in a tank, it is often necessary to control the maximum amount of liquid in the tank. For example, some state statutes prohibit filling a tank beyond 80% of its capacity with liquid petroleum gas. Thus, it is desirable to equip such tanks with a device which automatically prevents the tank from being filled in excess of the predetermined level. A variety of control devices have been designed for controlling the flow of liquid or gas. Five such devices are shown by the patents issued to Sperling, U.S. Pat. No. 1,492,272; Norway, U.S. Pat. No. 2,499,409; Browning, U.S. Pat. No. 2,504,638; McGillis et al., U.S. Pat. No. 2,569,110; and Wiseman et al., U.S. Pat. No. 2,431,721. Typically these devices utilize a float valve combination to slowly open or close the fluid inlet port. As a result, the valve when closing may not seat properly on the valve seat.

The devices of Mosher, U.S. Pat. No. 2,854,022 and Brown U.S. Pat. No. 3,756,269 utilize linkages for operably connecting the float to the valve in such a way that the valve will snap shut thereby assuring that the valve seats properly on the valve seat. Although possibly an improvement to the devices listed above, the linkages of Mosher and Brown are perhaps not as dependable and inexpensive as they might be as compared to a simpler design.

SUMMARY OF THE INVENTION

One embodiment of the present invention is a valve for limiting the flow of liquid into a tank which comprises a valve body mountable to the side wall of the tank having a valve seat and a passage for liquid to flow therethrough, a float pivotally attached to said valve body and positionable relative to the side wall of the tank at an elevation corresponding to a maximum liquid level and a closure element. There is also provided a cam device movable by the float. The closure element is movable by a spring acting between said valve body and the closure element toward said valve seat to a closed position against said valve seat and away from said valve seat to an open position and is movable to said closed position under incoming liquid pressure thereby closing said passage. The cam device is operable to prevent movement of said closure element to said closed position when the float is below the maximum liquid level.

One object of the present invention is to provide an improved valve for limiting the flow of liquid into a tank.

Related objects and advantages of the present invention will be apparent from the following description.

DESCRIPTION OF THE PREFERRED EMBODIMENT

Figure 1:
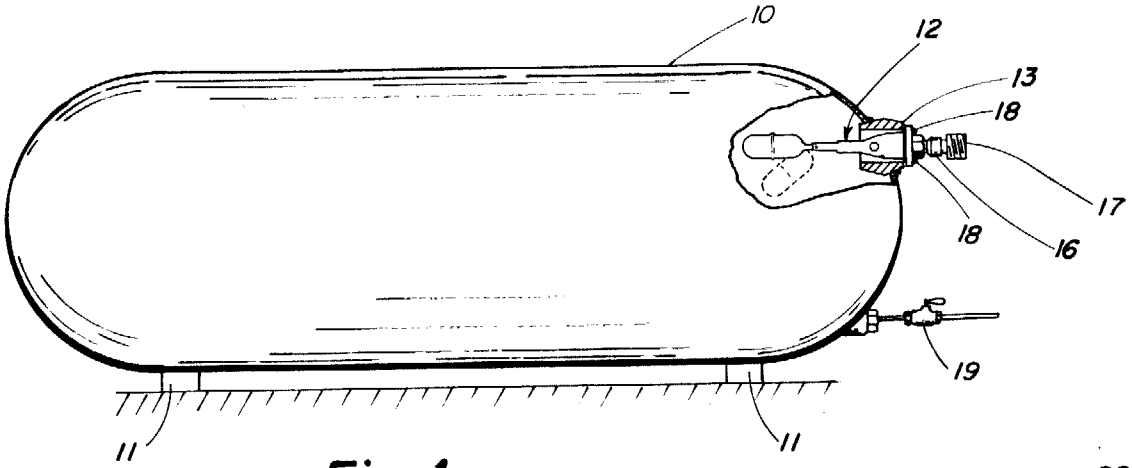
FIG. 1 is a side view of a liquid petroleum tank with a portion cut away showing an automatic valve incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a liquid petroleum tank 10 mounted on feet 11 and having a mounting flange 13 welded to the wall of tank 10 at an elevated position. Automatic valve 12 is mounted onto flange 13 by fasteners 18 and back check fill valve 16 is threaded into automatic valve 12. There are several commercially-available back check fill valves which are suitable for this application, such as, for example, Model No. D113, manufactured by Fischer Controls Co., McKinney, Tex. End 17 of back check fill valve 16 is externally threaded for receiving a filler hose leading from a pump or storage tank for filling tank 10 with liquid petroleum gas. A conventional outlet valve 19 is mounted to tank 10 for the liquid petroleum gas exit. Pipes are mounted to valve 19 for carrying the gas to various user locations.

Figure 2:
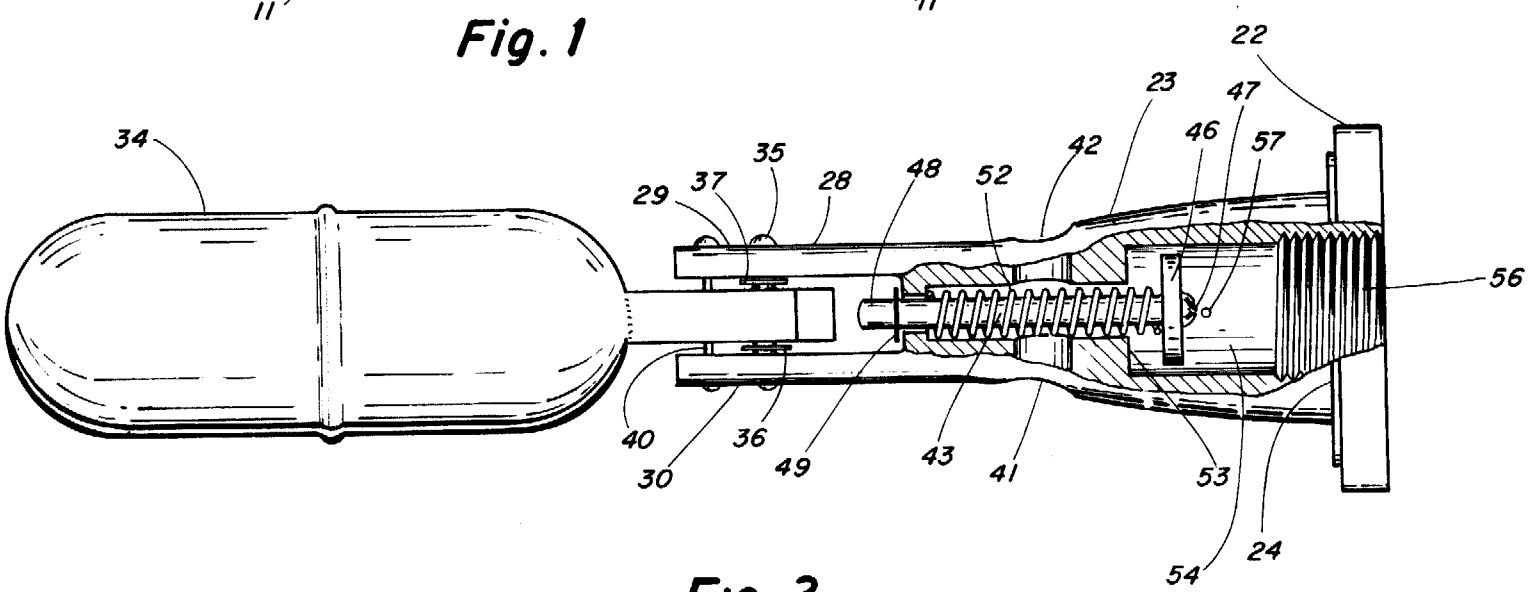
FIG. 2 is a fragmentary top view of the automatic valve of FIG. 1.

A fragmentary top view of automatic valve 12 removed from mounting flange 13 is shown in FIG. 2 having a mounting base 22 integrally connected to hollow valve body 23 by shoulder 24. Base 22 is fastened to mounting flange 13 by fasteners 18, as shown in FIG. 1. End 28 of valve body 23 is U-shaped having a pair of arms 29 and 30 rotatably holding cam 31 which is attached to one end of float 34. Float 34 and cam 31 which have motion limited to a vertical plane relative to tank 10 are pivotally connected to arms 29 and 30 by means of pin 35 which is inserted through cam 31 and arms 29 and 30 and is headed at each end of order to remain fixed in position. Washers 36 and 37 are positioned one on each side of cam 31 and serve a function similar to bearing spacers. Washers 36 and 37 keep cam 31 centered between arms 29 and 30 as cam 31 pivots about pin 35. Pin 40 is mounted on the valve body 23 and extends through an open area of cam 31 and acts as a stop such that float 34 and cam 31 have a limited range of rotation in the vertical plane from about 40 degrees below horizontal to slightly above horizontal. The open area of cam 31 and the limiting position of pin 40 are shown in dotted lines in FIG. 3. The valve body 23 has a pair of openings 41 and 42 through which liquid petroleum will pass when tank 10 is being filled.

Stem 43 extends longitudinally through valve body 23 and is attached to closure member or flap 46 by screw 47 at one end. The other end 48 of stem 43 is rounded and projects outwardly from valve body 23 between arms 29 and 30. Stem 43 is limited by retaining ring 49 against further movement into valve body 23. The retaining ring 49 is received in a suitable recess in the stem 43. Spring 52 is a compression spring which is disposed about stem 43 and acts between valve body 23 and closure flap 46. Closure flap 46 is positioned adjacent to valve seat 53 such that when closure flap 46 is against valve seat 53, liquid petroleum entering inlet 54 will be unable to pass into tank 10 by way of openings 41 and 42. Conversely, when flap 46 is positioned away from valve seat 53, by the cooperating action of cam 31 and stem 43, liquid petroleum is allowed to pass through openings 41 and 42 thereby filling tank 10. Located within inlet 54 is a small bleeder hole 57 which releases any pressure which becomes trapped between closure flap 46 and back check fill valve 16.

Figure 3:
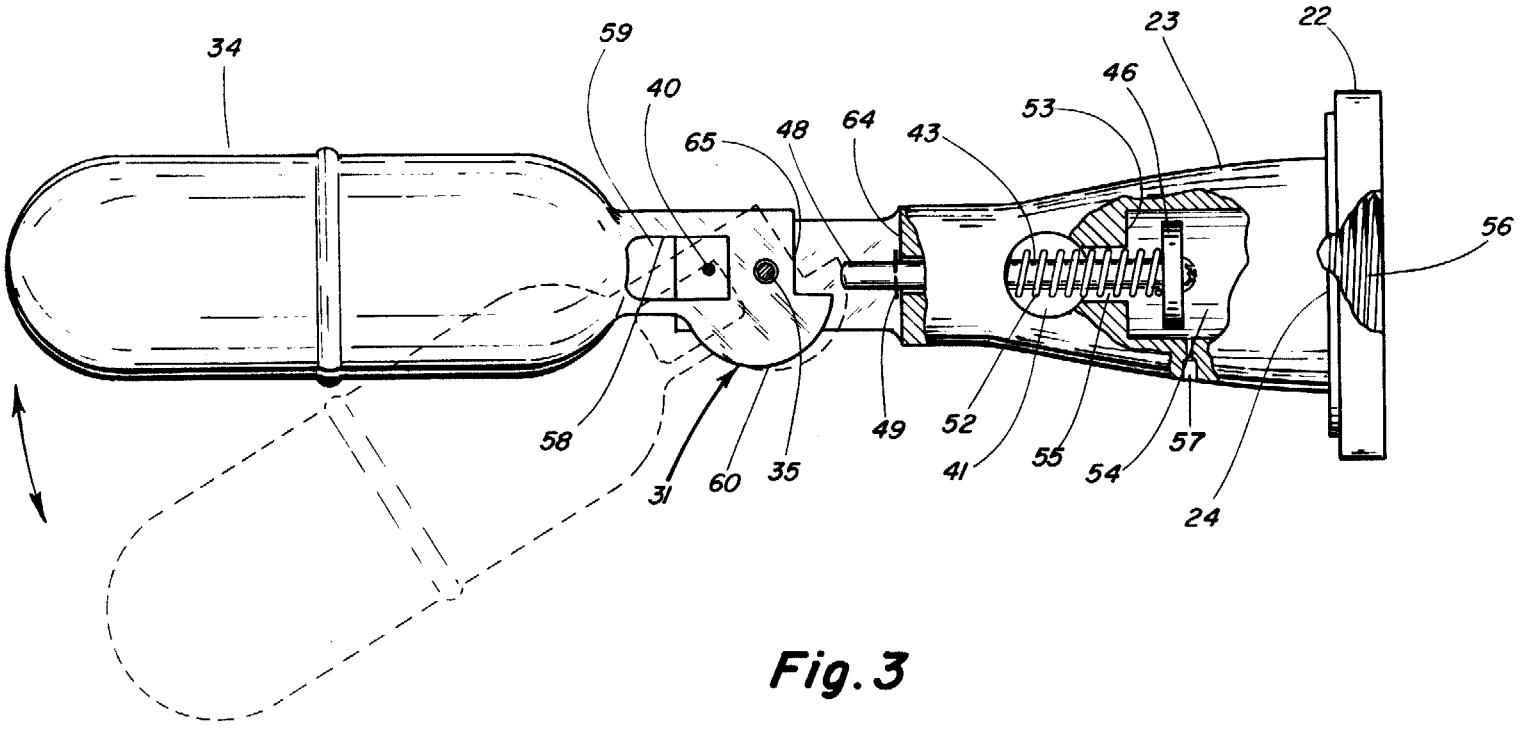
FIG. 3 is a fragmentary side view of the automatic valve of FIG. 1.

FIG. 3 is a fragmentary side view of valve 12 showing the internal design of valve body 23 and the relationship between cam 31, stem 43, and spring 52. Base 22 has an internally-threaded aperture 56 which receives back check fill valves 16 (see FIG. 1). When the tank is being filled, liquid petroleum passing through valve 16 will enter inlet 54, flow through one end of passage 55, and move into tank 10 by way of openings 41 and 42.

The petroleum is exhausted from the tank through the valve 19. As the tank 10 becomes empty, float 34 is pivoted to a downward position such that top edge 58 of open area 59 of cam 31 engages pin 40. Once this occurs, float 34 is unable to pivot any further in the downward direction. In such a position, the curved surface 60 of cam 31 is rotated to an upward position thereby coming into abutting engagement with end 48 of stem 43. Consequently, curved surface 60 of cam 31 holds stem 43 in the valve body 23 and retaining ring 49 is held up against surface 64 of valve body 23 and closure flap 46 is held away from valve seat 53. The closure flap 46 is held in an open position for filling tank 10 by the spring 52. As liquid petroleum enters inlet 54 of tank 10 by way of valve 16, the pressure of the liquid petroleum applies a force to closure flap 46 and attempts to move flap 46 toward valve seat 53. However, the curved surface 60 of cam 31 acting on the end 48 of stem 43, blocks the stem and prevents such movement from occurring. As liquid petroleum gas continues to be added to tank 10, the liquid level within tank 10 will rise and come into contact with float 34. With continued filling float 34 will be moved in an upward direction by a pivoting motion about pin 35 due to flotation within the liquid petroleum. As float 34 reaches a horizontal position, surface 60 of cam 31 will rotate in a clockwise direction and slide off of end 48. This motion of cam 31 will pivot L-shaped area 61 of cam 31 into position adjacent to end 48 of stem 43. The clearance which L-shaped area 61 provides allows ends 48 of cam 43 to be pushed toward face 65 of cam 31 in response to the liquid petroleum pressure which is applied to closure flap 46. As stem 43 moves toward cam 31, the force of spring 52 is overcome and the spring 52 is compressed allowing closure flap 46 to make a sealed contact with valve seat 53. Consequently, openings 41 and 42 are closed from inlet 54 and the liquid petroleum can no longer flow into tank 10.

Back check fill valve 16 prevents liquid petroleum gas from escaping from tank 10 when the filler hose is disconnected from end 17 (see FIG. 1). Once the pressure trapped between closure flap 46 and back check fill valve 16 is released by means of bleeder hole 57, spring 52 acts on closure flap 46 pushing it away from valve seat 53 as spring 52 returns to its at rest condition and closure flap 46 returns to its normally open position. As this occurs end 48 of stem 43 will be drawn out of L-shaped area 61 thereby allowing cam 31 unobstructed pivoting motion in a counter-clockwise direction about pin 35 as float 34 pivots downwardly in response to a decreasing fluid level within tank 10. Thus curved surface 60 of cam 31 will slide into abutting engagement with end 48 of stem 43 so that the filling cycle of tank 10 can be repeated in the same manner as has been described.

Mounting flange 13 and automatic valve 12 can be mounted at virtually any elevation on the side wall of tank 10, depending upon the design of the valve 12, the shape of tank 10 and the desired maximum liquid level to which tank 10 will be fillable. Since some state statutes prohibit filling the tank beyond 80% of its capacity, one preferred maximum liquid level would be 80% of tank capacity. Thus, flange 13 and valve 12 can be positioned for this value and will automatically prevent tank 10 from being filled in excess of this predetermined level.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A valve for limiting the flow of liquid into a tank which comprises:

a valve body including a valve seat and a passage for liquid to flow therethrough, said valve body being mountable in a substantially horizontal position to the side wall of a tank;

a float pivotally attached to said valve body;

a normally open closure element positioned within said valve body and movable toward said valve seat to a closed position against said seat and away from said valve seat to an open position, said closure element being movable to said closed position under incoming liquid pressure thereby closing said passage;

a spring disposed between said valve body and said closure element, said spring being operable to return said closure element to said open position from said closed position once said incoming liquid pressure ceases to be present thereby opening said passage; and a single cam member movable by said float to a suitable orientation relative to said closure element and locking said closure element against any movement toward said closed position when said float is below a maximum fluid level.

2. The valve of claim 1 wherein said closure element includes a movable stem extending through said valve body with a first end and a second end, said closure element further including a closure member which engages said seat, said first end being attached to said closure member, said second end abuttingly engageable with said cam device.

3. The valve of claim 1 in which said spring is a compression spring having sufficiently small spring constant and length that said spring is compressible and said closure element is movable against said valve seat in response to said incoming liquid pressure.

4. The valve of claim 2 in which said cam member includes a recess which is positioned adjacent to said first end when said tank reaches said maximum fluid level, said recess providing clearance for said stem to move into as said closure member engages said seat.

5. The valve of claim 4 wherein said cam member is integral with said float.

6. The valve of claim 1 wherein said spring is at rest when said closure element is at said normally open condition.

7. The valve of claim 1 in which said valve further includes a bleeder hole positioned between said valve seat and the location of incoming liquid for relieving pressure trapped between said valve seat and said location of incoming liquid when said closure element is in said closed position.

8. The valve of claim 1 wherein said valve is an LP gas valve and said tank is an LP gas tank.

9. The LP gas valve of claim 8 in which said valve further includes a bleeder hole positioned between said valve seat and the location of incoming liquid for relieving pressure trapped between said valve seat and said location of incoming liquid when said closure element is in said closed position.

10. The LP gas valve of claim 9 wherein said spring is at rest when said closure element is at said normally opened condition.

*11. A valve for limiting the flow of liquid into a tank which comprises:*

*a valve body including a valve seat and a passage for liquid to flow therethrough, said valve body being mountable to the side wall of a tank;*

*a float pivotally attached to said valve body;*

*a normally open closure element positioned within said valve body and movable toward said valve seat to a closed position against said seat and away from said valve seat to an open position, said closure element being movable to said closed position under incoming liquid pressure thereby closing said passage;*

*a spring disposed between said valve body and said closure element, said spring being operable to return said closure element to said open position from said closed position once said incoming liquid pressure ceases to be present thereby opening said passage; and*

*a single cam member movable by said float to a suitable orientation relative to said closure element and locking said closure element against any movement toward said closed position when said float is below a maximum fluid level.*

* * * * *